United States Patent [19]

Campbell

[11] 4,214,435
[45] Jul. 29, 1980

[54] METHOD FOR REDUCING NITROUS OXIDE EMISSIONS FROM A GAS TURBINE ENGINE

[75] Inventor: Thomas C. Campbell, Glendale, Ohio

[73] Assignee: General Electric Company, Cincinnati, Ohio

[21] Appl. No.: 947,683

[22] Filed: Oct. 2, 1978

Related U.S. Application Data

[63] Continuation-in-part of Ser. No. 819,022, Jul. 25, 1977, abandoned.

[51] Int. Cl.² ............................................. F02C 7/00
[52] U.S. Cl. .................................. 60/39.05; 60/39.59; 60/39.46 S
[58] Field of Search ............... 60/39.05, 39.53, 39.55, 60/39.58, 39.59, 39.46 S; 44/51

[56] References Cited

U.S. PATENT DOCUMENTS

| | | | |
|---|---|---|---|
| 2,892,694 | 6/1959 | Weeks | 44/51 |
| 3,921,389 | 11/1975 | Kawaguchi | 60/39.05 |
| 4,084,934 | 4/1978 | Kumazawa | 60/39.55 |
| 4,110,973 | 9/1978 | Haeflich et al. | 60/39.05 |

Primary Examiner—Louis J. Casaregola
Attorney, Agent, or Firm—Derek P. Lawrence

[57] ABSTRACT

A simplified method is provided for turbulently mixing separate flows of fuel and water prior to delivery to the combustor of a gas turbine engine to reduce the temperature to which pressurized air is heated by the combustion of fuel, thereby reducing nitrous oxide emissions in the products of combustion. The method employs no complex homogenization equipment and no emulsifying agents are intentionally added to either the fuel or the water.

3 Claims, 4 Drawing Figures

U.S. Patent    Jul. 29, 1980    4,214,435
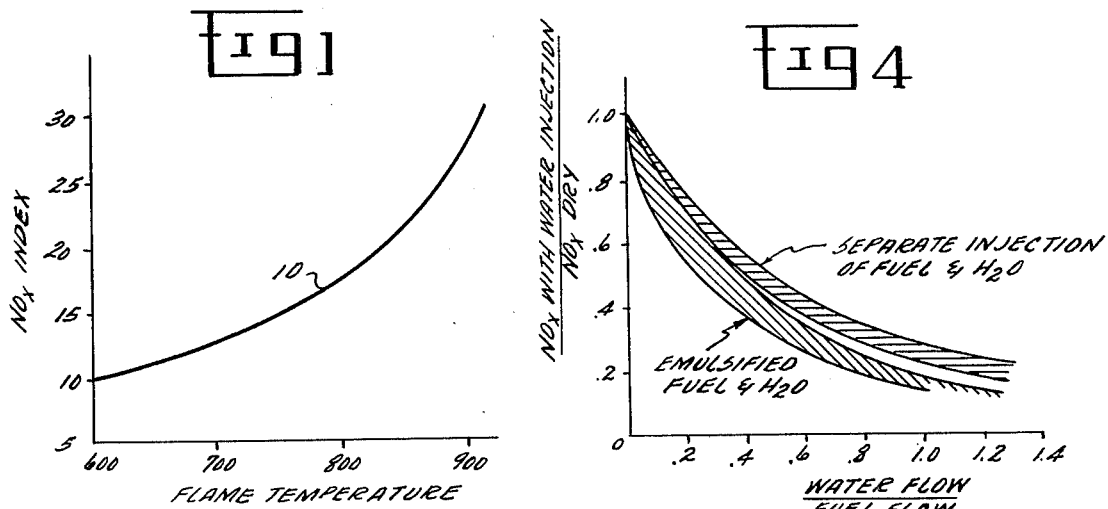
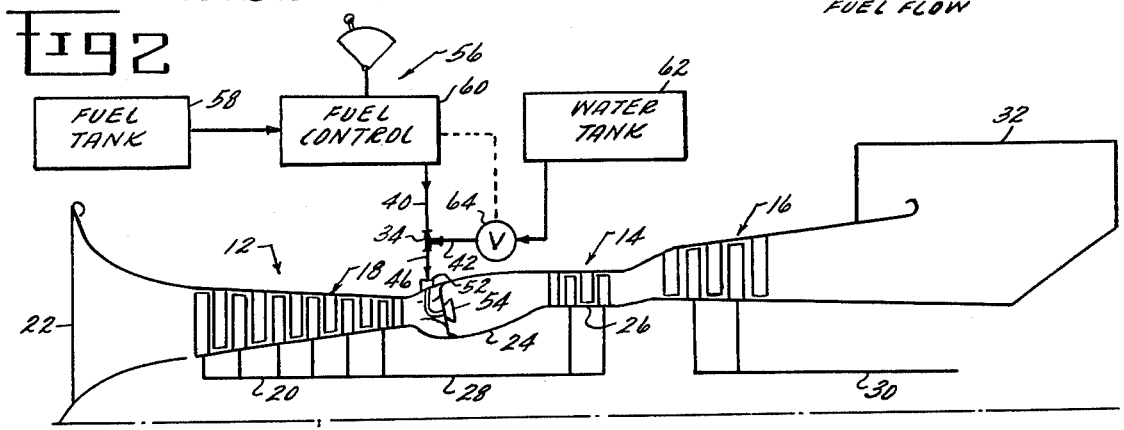
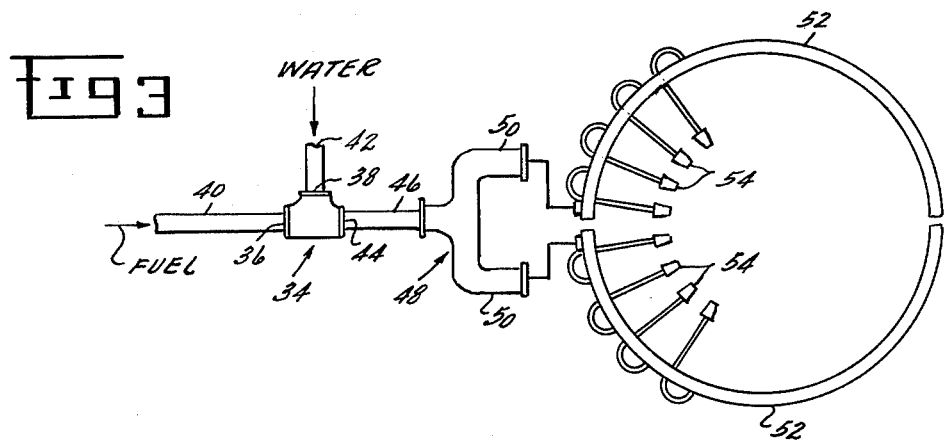

METHOD FOR REDUCING NITROUS OXIDE EMISSIONS FROM A GAS TURBINE ENGINE

CROSS-REFERENCE TO RELATED APPLICATION

This is a continuation-in-part of Ser. No. 819,022, filed July 25, 1977 (now abandoned) and entitled, "Water Injected for Gas Turbine Engine Emission Control."

BACKGROUND OF THE INVENTION

1. Field of the Invention

This invention relates to gas turbine engines and, more particularly, to a simplified method for reducing nitrous oxide emissions through the technique of water injection.

2. Description of the Prior Art

In this era of environmental awareness it is anticipated that regulations covering air pollution will become increasingly restrictive and that compliance with industrial emission standards will become more difficult to attain. These environmental considerations will have an impact upon the development of industrial gas turbine engine power plants and may require the reduction of exhaust emission levels consistent with available technology at realistic costs. However, the trend in gas turbine engine development is toward higher temperature engines which, though they are inherently more efficient, also tend to produce higher emission levels of nitrous oxide ($NO_x$).

It is generally accepted that $NO_x$ formation increases exponentially with flame temperature. It has also been generally acknowledged that $NO_x$ formation can be reduced by introducing water in the form of liquid or steam into the combustion process to reduce the temperature to which the air is heated by the combustion of fuel in the primary zone of combustion. Because of the exponential increase of $NO_x$ formation with flame temperature, relatively large reductions in $NO_x$ can be achieved with relatively low water flow rates. Furthermore, the specific method of water injection in gas turbine engines does not appear to be particularly important. Water has been injected separately into the combustor through distinct water nozzles as a liquid and as steam. It has also been injected into the combustor in the upstream, downstream and "side stream" directions through separate water passages in the fuel injector. It has even been introduced through dual-flow nozzles wherein the water and fuel were injected coaxially into the combustor. However, although these methods of injecting water have been successful in controlling $NO_x$, they have, on occasion, produced some problems with hardware life due to local temperature gradients in the region where the water is being injected. In fact, instrumented sector tests have demonstrated that in using the upstream method of injecting water through the nozzle, combustor metal temperature variations increase from a normal 260° C. temperature variation with no water injection to a 427° C. variation with the amounts of water injection necessary to achieve significant $NO_x$ reductions. While these temperature variations are the measured results of one particular series of engine sector tests, they are representative of the trend in temperature variations to be found in other gas turbine engine combustors.

More recently, a concept for emulsifying the fuel and water together and injecting the mixture through the normal (or enlarged) fuel nozzles has been used successfully. This has considerable advantages over the systems relying on separate injection of fuel and water since complexity is minimized, separate nozzles may be eliminated, and costs reduced accordingly.

There is an old axiom that fuel and water won't mix. However, they will—but only temporarily. They then separate at a rate that appears to be a function of the specific gravity of the fuel. As the specific gravity approaches unity (where fuel has the same density as water), the separation rate becomes much slower. To achieve satisfactory fuel-water emulsion, current practice has been to process the two separate liquids through a homogenizer where each is pressurized to a very high level and then sprayed through extremely small orifices into impingement against a hard impact block in a common mixing chamber. The impact breaks each fluid into extremely fine particles which become intimately mixed, or emulsified, into one homogeneous fluid. The subsequent separation rate is apparently slowed by the intimacy or fineness of the emulsion. This homogenizing equipment is, of course, very bulky and costly.

Since water suppression of $NO_x$ is simply a function of water concentration, the emulsion concept is only one means employed to assure that each fuel nozzle is supplied with the same quantity of fuel and water as are all the others. Since all nozzles are supplied by a common pressure source (usually a fuel manifold), then all will flow the same rate of fluid, be it fuel, water or a fuel-water emulsion. If separation occurs prior to combustion, then some nozzles will flow more fuel (or water) than others and unacceptable temperature distributions will result inside the engine. In fact, it has been found that fuel variations between nozzles in excess of 10 percent are generally undesirable. In short, the fuel and water need be mixed or emulsified only to the extent required to assure uniform distributions throughout the manifolded fuel nozzles. Since state-of-the-art fuel-water emulsifiers or homogenizers are inherently complex, heavy and costly, it would be advantageous to develop a simple emulsifier which merely meets requirement of uniform fuel distribution among the manifolded nozzles.

SUMMARY OF THE INVENTION

Accordingly, it is the primary object of the present invention to provide a method for reducing $NO_x$ emissions from gas turbine engine combustors through a simplified concept of water injection.

It is yet another object of the present invention to provide a method of operating a gas turbine engine with water injection which minimizes the variation in fuel percentage between a plurality of nozzles by prolonging the fuel-water separation time.

These and other objects and advantages will be more clearly understood from the following detailed descriptions, the drawings and specific examples, all of which are intended to be typical of, rather than in any way limiting on, the scope of the present invention.

Briefly stated, these objects as well as additional objects and advantages which will become apparent from the following specification and the appended drawings and claims are accomplished by the present invention which provides a method for reducing nitrous oxide emissions from the combustion products of a gas turbine engine. The method comprises turbulently mixing separate flows of fuel and water in a water:fuel ratio in the range of 0.6 to 1.4 by weight. The mixing is conducted under conditions which are sufficient to produce turbulence with a Reynolds number of at least 1500 in the resulting mixture. The resulting mixture is then delivered, within thirty seconds from the time the fuel and water are mixed, to a plurality of combustor nozzles for combustion.

BRIEF DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiments which are given by way of example with the accompanying drawings in which:

FIG. 1 is a graphical representation of the variation in $NO_x$ emissions from a gas turbine engine with flame temperature;

FIG. 2 is a partial cross-sectional schematic view of a gas turbine engine incorporating the $NO_x$ reduction method of the subject invention;

FIG. 3 is an enlarged fragmentary view of the fuel-water mixing apparatus of the gas turbine engine of FIG. 2; and FIG. 4 graphically compares the effect of water injection on $NO_x$ emissions for separate injection of fuel and water an emulsified mixture of fuel and water.

DESCRIPTION OF THE PREFERRED EMBODIMENT

Referring to the drawings wherein like numerals correspond to like elements throughout, attention is first directed to FIG. 1 which is a graphical representation of the exponential relationship of $NO_x$ generation (represented by a nondimensional $NO_x$ index) with flame temperature in a gas turbine engine. Line 10 represents the locus of test data relating to this phenomenon. It is generally recognized that $NO_x$ control can be achieved by injecting liquid water or steam into the combustion process to lower peak flame temperatures and, since the relationship between $NO_x$ generation and flame temperature is exponential, it can be appreciated from FIG. 1 that relatively small amounts of water injection can produce large reductions in $NO_x$. The invention soon to be described relates to the reduction of $NO_x$ in gas turbine engines and embodies the $NO_x$ reduction-through-water-injection concept depicted in FIG. 1.

While it is recognized that gas turbine engines are, by now, well understood in the art, a brief description of a representative engine will enhance appreciation of the interrelationship of various components in light of the invention soon to be described. To that end, attention is now directed to FIG. 2 wherein a gas turbine engine of the marine or industrial variety, depicted generally at 12 and embodying the method of the present invention, is diagrammatically shown. This engine may be considered as comprising a core engine 14 and an independent power turbine 16. The core engine includes an axial flow compressor 18 having a bladed rotor 20. Air enters inlet 22, is compressed by compressor 18 and is then discharged to a combustor 24 where it is normally mixed with fuel and combusted to provide high energy combustion gases to drive the core engine turbine 26. Turbine 26, in turn, drives rotor 20 through shaft 28. The hot gases of combustion then pass through and drive the power turbine 16 which, in turn, drives an energy-absorbing device (not shown) through power shaft 30. Power is thus obtained by the action of the hot gases of combustion driving power turbine 16. The products of combustion are then collected and exhausted through discharge nozzle 32 which, in some applications, may be a propulsive nozzle. The above description is typical of many present-day gas turbine engines of the industrial power generation or marine propulsion variety and is not meant to be limiting on the present invention since it will soon become readily apparent from the following description that the method of the present invention is capable of application to any gas turbomachine, whether of the turbojet, turboprop or turboshaft variety. The foregoing description of the operation of the engine of FIG. 2 is, therefore, merely meant to be illustrative of one type of application.

The present invention provides a simplified method for emulsifying fuel and water to reduce gas turbine engine $NO_x$ emissions and to achieve a more uniform fuel-water distribution within the combustor of the gas turbine engine. Directing attention now to FIG. 3, there is depicted schematically an apparatus which embodies the method of the present invention. Surprisingly, it was discovered that when water was added to a gas turbine engine fuel delivery system through a simple plumbing "T" 34, sufficient homogenization occurred. In particular, T-section 34 is provided with a first inlet 36 for receiving a flow of fuel under pressure and a second inlet 38 for receiving a flow of water under pressure. Pipes or tubes 40, 42 are connected to inlets 36, 38, respectively, and comprise portions of the respective fuel and water delivery systems. The water and fuel flows are pipe flows, not sprays or mists, and are generally normal to each other at their point of confluence within the "T" to produce turbulent mixing therein. A single outlet 44 discharges the mixture into a pipe 46 by which the mixture is carried to a flow splitter 48. Each splitter leg 50 communicates with a generally semicircular fuel manifold 52 delivering the resulting mixture to a plurality of combustor nozzles 54 disposed within the upstream end of combustor 24 (see FIG. 2) in the usual manner of a gas turbine engine.

When the fuel and water are introduced into the "T" at conditions sufficient to produce turbulent mixing with a Reynolds number of at least 1500 sufficient homogenization occurs without the intentional addition of any emulsifying agents to either the fuel or the water such that the proportions of fuel and water in the resulting mixture which is delivered to each nozzle 54 are sufficiently uniform. In tests performed using a mixing "T" having a 0.375" diameter water inlet, a 0.625" diameter fuel inlet and Diesel No. 2 as the fuel, a 1% variation in fuel content was measured at the discharge of splitter legs 50. In one manifold section 54 having fifteen nozzles, a 3.5% fuel variation (maximum minus minimum, divided by average) was recorded at the nozzle discharge. With JP4 fuel, the fuel variation at the nozzles was 10%. For yet unexplained reasons, when the water inlet diameter was reduced to 0.31", the percent fuel variation (for Diesel No. 2) between splitter legs 50 increased from 1% to as high as 7.8%, yet still within acceptable limits. Experimental accuracy may account for some of this difference.

The flow velocity rates in a gas turbine engine are such that in this particular embodiment, the elapsed time that it takes to travel from the "T" element (which, practically speaking, is located just upstream of the fuel manifolds) to the most distant nozzle 54 is only a few seconds, well within the "stay" time of the mixture. However, other embodiments of the present invention may employ a "T" element or other mixing chamber at a location which is somewhat removed from the combustor. Experimentation has shown that although the "stay" time of the mixture could be longer than one minute, the best results insofar as nozzle fuel variation percentages are achieved if the time between the mixing of the fuel and water and the combustion of the resulting mixture does not exceed thirty seconds.

Tests conducted utilizing the present invention showed that $NO_x$ reductions attained with the use of the fuel-water mixtures were somewhat greater than those obtained with separately injected water. FIG. 4 shows a comparison of the $NO_x$ emissions measured during these tests. For example, a $NO_x$ reduction of 50% would require a water-to-fuel ratio of 0.6 when the water is injected separately. The same $NO_x$ reduction could be obtained with a ratio of 0.4 when the mixture is emulsified in accordance with the method of the present invention.

The method of the present invention was incorporated into a gas turbine engine, such as the representative industrial-type gas turbine engine of FIG. 2, having a fuel flow delivery system 56 comprising, in part, a tank 58 from which fuel is pumped and routed through a fuel control 60 of a known variety which is responsive to operator throttle input and which senses and compensates for measured engine parameters. Fuel from such a control is routed to the inlet side 36 of "T" 34. Water is pumped to T-inlet 38 from a tank 62 and through a valve 64 which is interlocked with the output of the fuel control to maintain the desired water-fuel mixture ratio. Such a control apparatus is within the skill of those familiar with such control art and is beyond the scope of the present invention.

It was also discovered that when the water-fuel ratio for Diesel No. 2 exceeds 0.7 by weight, the consistency of the resulting mixture begins to change from suspended water drops in fuel to a homogeneous mixture having the characteristics of a pseudoplastic fluid. The change from suspended water drops in fuel to the homogeneous mixture is completed as the ratio approaches 1.0 by weight. Whereas the normal mixture of suspended water drops tends to begin separation almost immediately, the homogeneous mixture tends to remain mixed for somewhat longer periods. Experimentation has shown that the homogeneous mixture may require as long as two to eight hours to completely separate. Clearly, this reduced tendency to separate means that a more uniform fuel distribution may be obtained between the plurality of nozzles and that the mixing "T" can be located further from the nozzles. Tests performed with JP4 fuel showed that the homogeneous mixture begins to form at a water-to-fuel ratio of 0.6 by weight and is fully formed at a water-fuel ratio of 1.4 by weight.

The phenomenon causing the homogeneous mixture to form can probably be explained by the large difference in surface tension of the two fluids. Application of high shear stress to the two-phase mixture results in more subdivision of the fuel phase than the water phase. Initially, the fuel is a continuous phase while the water is in relatively large drops that settle rapidly. As water addition continues, a point is reached where a phase reversal occurs and the water becomes the continuous phase having the fuel suspended therein as relatively small drops with little opportunity to coalesce and separate. The mixture thus formed is probably a pseudoplastic fluid rather than a Newtonian fluid (such as the fuel or water alone). The process can be reversed by adding large quantities of fuel to the mixture while the shearing action continues.

It should become obvious to one skilled in the art that certain changes can be made to the above-described invention without departing from the broad inventive concepts thereof. For example, the present invention is meant to embrace any arrangement whereby one flow of fuel and one flow of water, are combined turbulently without necessity of complex homogenizers. While a simple plumbing "T" section has been demonstrated to be effective, this is merely one example of a means for directly combining the two fluids through turbulent mixing to produce a homogeneous mixture. It is intended that the appended claims cover this and any other variations in the present invention's broader inventive concepts.

Having thus described the invention, what is claimed as novel and desired to be secured by Letters Patent of the United States is:

1. A simplified method for reducing $NO_x$ emissions from a gas turbine engine having a combustor in which a flow of pressurized air is mixed with fuel and combusted comprising the steps of:
    (a) providing a flow of fuel under pressure;
    (b) providing a flow of water under pressure;
    (c) mixing directly, the fuel flow and the water flow in a water:fuel ratio in the range of 0.6 to 1.4 by weight and wherein the conditions are sufficient to produce turbulent mixing with a Reynolds number of at least 1500 in the resulting mixture; and
    (d) delivering the resulting mixture to a plurality of combustor nozzles for combustion, said combustion occurring within thirty seconds from the time the fuel and water flows are mixed.

2. The method as recited in claim 1 wherein when the fuel is Diesel Fuel No. 2, the water:fuel ratio is in the range of 0.7 to 1.0 by weight.

3. The method as recited in claim 1 wherein when the fuel is JP4, the water:fuel ratio is in the range of 0.6 to 1.4 by weight.

* * * * *